July 13, 1937.  H. P. ANDERSON ET AL  2,086,692
PRESSURE FLUID REGULATING MEANS
Filed Dec. 14, 1934  3 Sheets-Sheet 1

INVENTORS
Howard P. Anderson
Joseph B. MacKenzie
BY
E. Archer Turner
ATTORNEY.

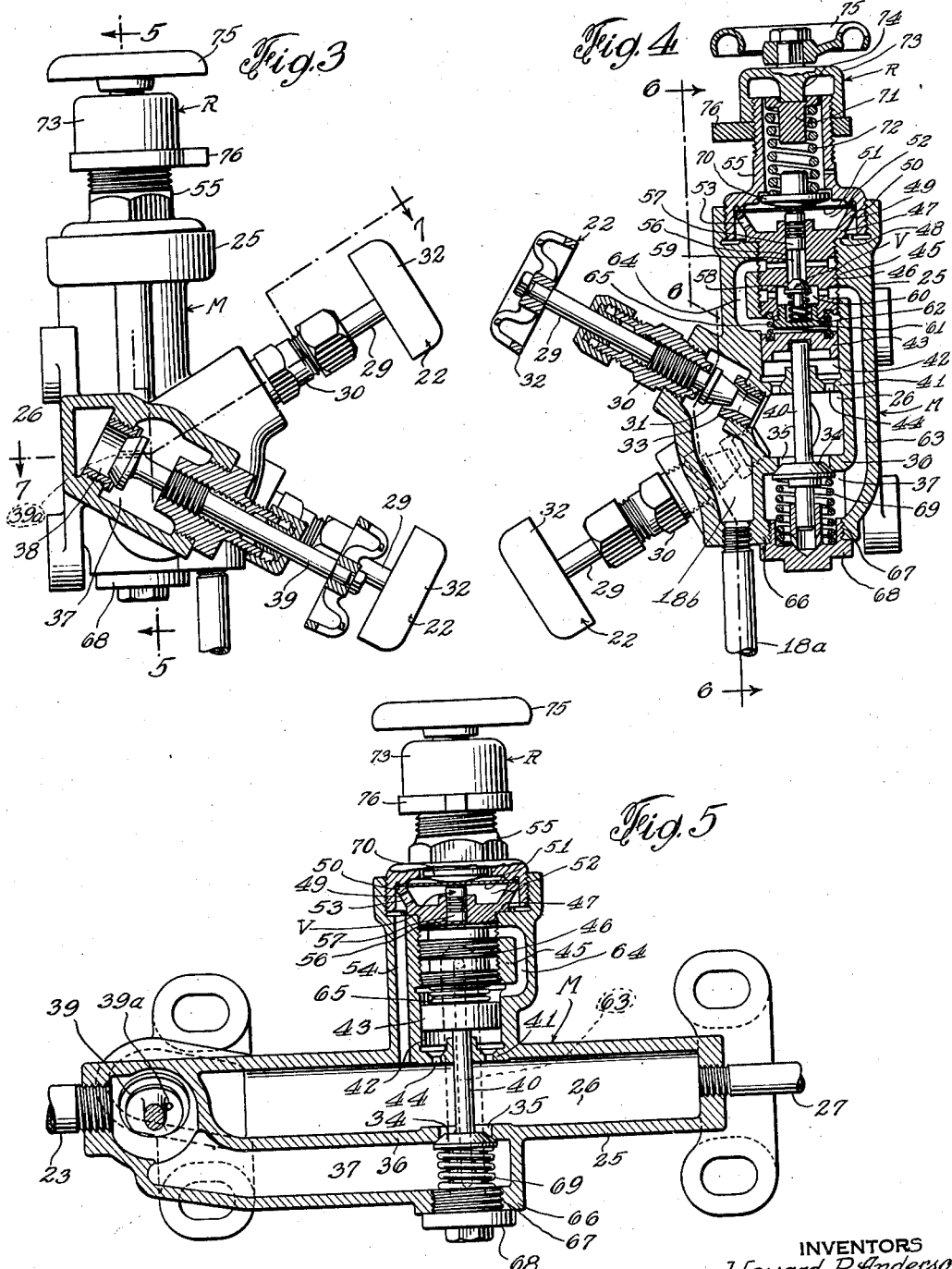

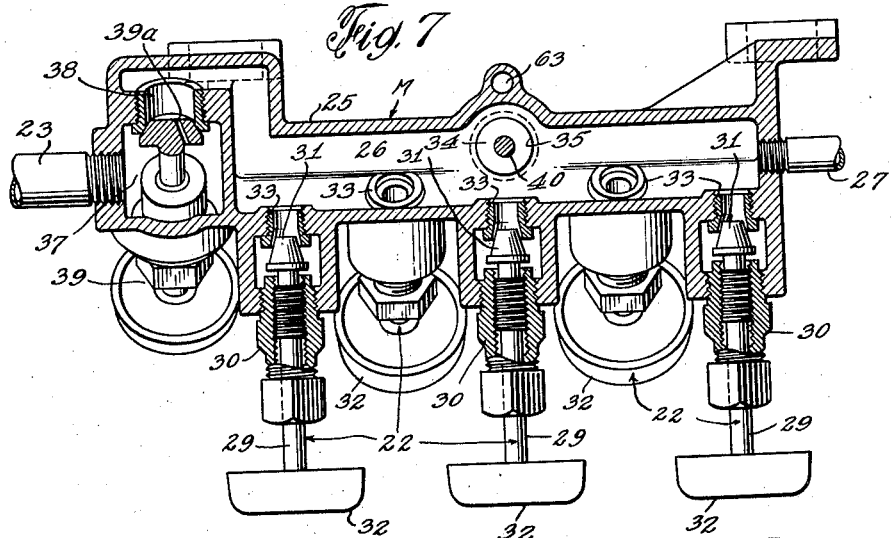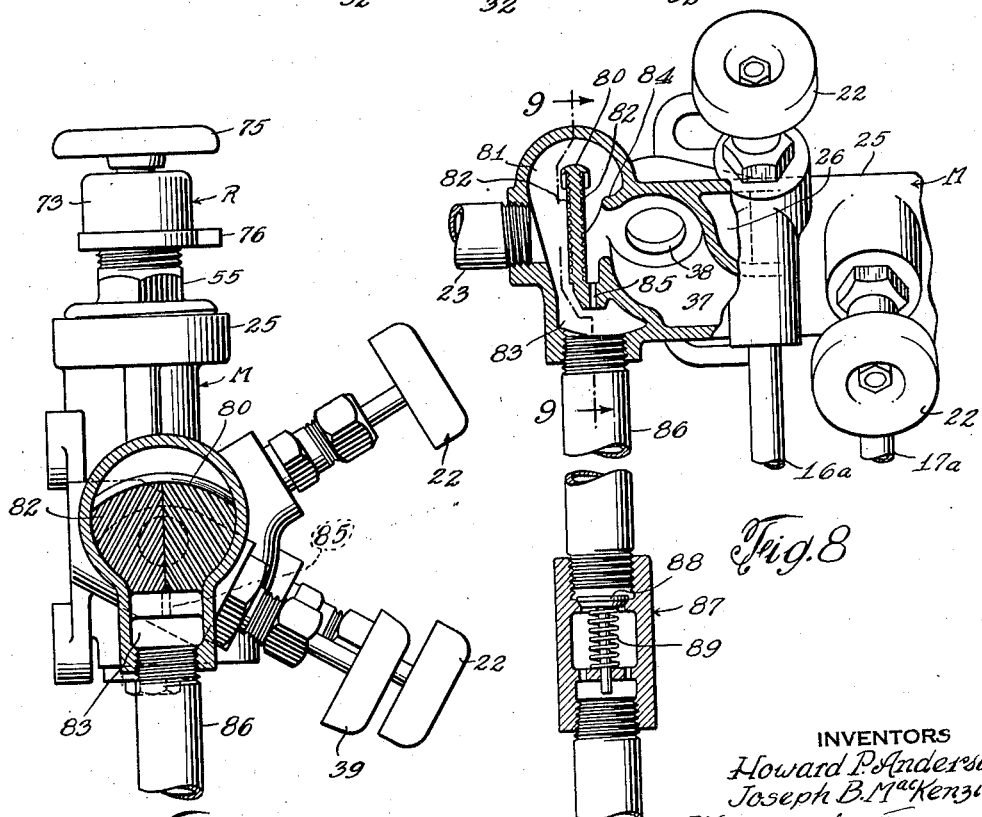

Patented July 13, 1937

2,086,692

UNITED STATES PATENT OFFICE 2,086,692

PRESSURE FLUID REGULATING MEANS

Howard P. Anderson and Joseph B. MacKenzie, Erie, Pa., assignors to The Standard Stoker Company, Inc., a corporation of Delaware Application December 14, 1934, Serial No. 757,420

2 Claims. (Cl. 50—11)

This invention relates to means for regulating or controlling the flow of pressure fluid from a source of supply to a chamber or point of ultimate use.

It is an important object of our invention to provide an improved regulating or control device which functions to maintain a predetermined pressure of fluid in a chamber which communicates with a source of supply and in which source the pressure of the fluid is subject to fluctuation.

Another object of our invention resides in the provision of improved means for regulating or controlling the flow of pressure fluid from a source of supply to several chambers each of which is provided with independent means for varying the pressure of fluid therein, the improved regulating or control means being arranged to maintain a predetermined pressure of fluid within certain of such chambers at times when the pressure of fluid in other chambers is varied.

In carrying out these objects, we have devised an improved regulating device which is very positive of action and one in which the predetermined or desired pressure of fluid is quickly attained. We attain this result by providing spring means for the main valve of the regulating device, which spring means retards reciprocation of the main valve, and this constitutes another object of our invention.

As a further object, the regulating or control means of our invention has been embodied in a stoker employing pressure fluid distributing means and functions to maintain a predetermined pressure of fluid in each of the several chambers of the stoker jet member regardless of fluctuations in the pressure of such fluid within its source of supply, or, when the pressure of fluid in certain jet chambers is varied, the regulating means is arranged to maintain the predetermined pressure of fluid within the other chambers of the jet member.

Other objects are to provide a means for separating the moisture from the pressure fluid before its passage through the regulating device; to provide an automatic drain for the condensate, such drain operating during a substantial reduction in the pressure of the fluid within the regulating device; and also to generally improve upon the construction of regulating devices, especially those for use with a manifold of a stoker pressure fluid distributing means.

Our invention is described and illustrated on the accompanying drawings in connection with a locomotive which is provided with a stoker having pressure fluid distributing means.

In these drawings,

Figure 3 is a sectional view taken on the line 3—3 of Figure 2;

Figure 4 is a sectional view taken on the line 4—4 of Figure 2;

Figure 5 is a sectional view taken on the line 5—5 of Figure 3, with certain parts in elevation;

Figure 7 is a sectional plan view taken on the line 7—7 of Figure 3;

Figure 8 is a partial elevation of a modification of the regulating device illustrated in Figures 1 to 7, with parts broken away and others in section; and Figure 9 is a sectional view taken on the line 9—9 of Figure 8.

Figure 1:
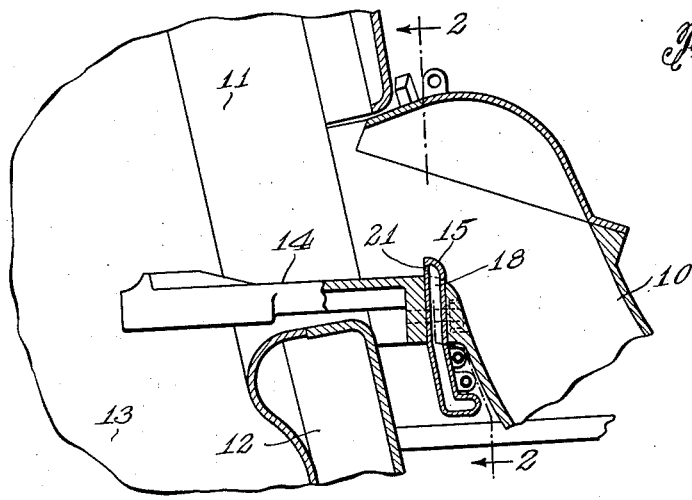
Figure 1 is a fragmentary view in central vertical section through a stoker embodying a pressure fluid distributing means, with certain portions of the stoker in elevation, and in which construction the regulating device according to our invention is employed.
Figure 2:
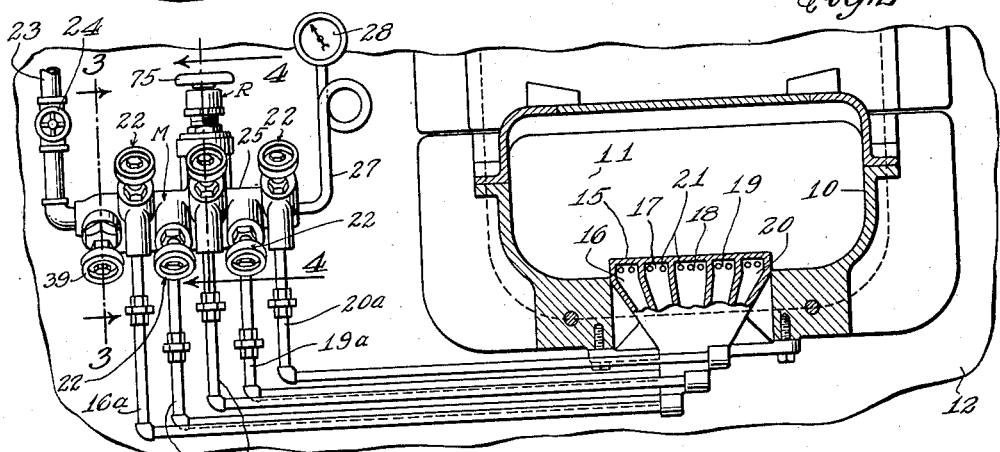
Figure 2 is a sectional view taken on the line 2—2 of Figure 1, with the regulating device of our invention shown in elevation.
Figure 6:
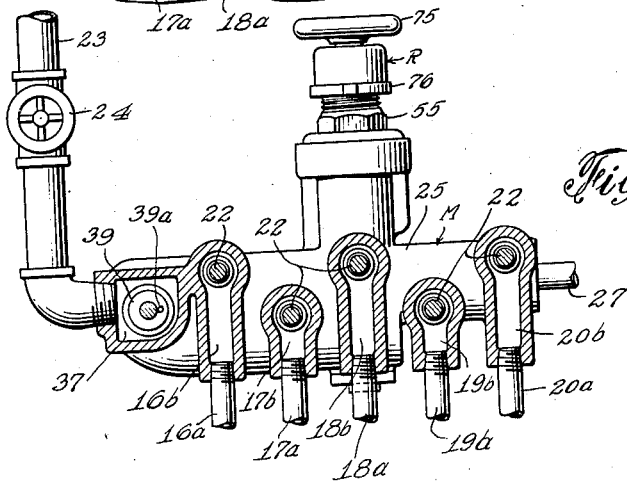
Figure 6 is a view partly in section and partly in elevation taken on the line 6—6 of Figure 4.

Referring particularly to Figures 1 and 2, a stoker discharge conduit is shown at 10 and it communicates with an opening 11 in a wall 12 of a furnace 13, such as that of a locomotive boiler. The conduit delivers fuel onto a distributing table 14 in front of the pressure fluid jet member 15 which issues blasts of pressure fluid against the fuel, and in conjunction with the distributing table 14, distributes the fuel to various parts of the firebed.

The jet member 15 is provided with a plurality of separated chambers, such as 16, 17, 18, 19 and 20, which receive pressure fluid through their respective pipes 16a, 17a, 18a, 19a and 20a. The pressure fluid issues from each of the separated chambers through orifices, such as 21, of which there may be several in each chamber, over the fuel receiving surface of the distributing table 14.

The jets of pressure fluid issuing from the orifices of the several chambers are directed toward predetermined areas of the firebed, and in order to provide for adequate control of the intensity of these blasts, and thus for the effective control of fuel distribution, each pipe 16a, 17a, 18a, 19a, and 20a is provided with a valve, such as 22, each of which is manually controllable and preferably carried by a manifold M. The manifold M receives pressure fluid from a suitable source of supply, such as the steam generating boiler of a locomotive, through a main lead 23 having a manually controlled valve 24 therein between the manifold M and the source of supply.

Within the body portion 25 of the manifold M there is a main chamber 26 which receives pressure fluid from the main lead 23 in a manner which will be hereinafter described more fully. Screwed into one end of the chamber 26 is a small lead 27 which conducts pressure fluid from the chamber to a gauge 28, which indicates the "manifold pressure". The pipes 16a, 17a, 18a, 19a and 20a are screwed into the manifold M and communicate with the chamber 26 through the respective passages 16b, 17b, 18b, 19b and 20b therein, the communication between each passage and the chamber 26 being controlled by the valve 22 which comprises a stem 29 threaded into a bonnet 30, the stem 29 having a valve member 31 at its inner end and the valve handle 32 at its outer end. A valve seat 33 is threaded into the body portion of the manifold between the chamber 26 and each of the passages 16b, 17b, 18b, 19b and 20b. Thus, when pressure fluid is present within the chamber 26, it will pass into the chambers 16, 17, 18, 19 and 20 of the jet member 15 at various pressures as determined by the setting of the valves 22.

The construction as above set forth is one which has been used to a considerable extent on stokers of the locomotive type, the main lead 23, in this construction, delivering the pressure fluid directly to the main chamber 26.

It has been found in actual service of the above described jet member pressure control means, and especially in the use of this means with a stoker as applied to a locomotive, that many undesirable conditions arise which adversely affect the function of the pressure fluid distributing means. Chief among these undesirable conditions is the fluctuation of pressure of the fluid in the main chamber 26. This is caused by sudden and excessive demands upon the boiler or steam generator, and when these demands occur a reduction in the pressure of the fluid, such as steam, will be apparent in all chambers which receive pressure fluid from the boiler or steam generator. This in turn results in a lower pressure of fluid passing through the valves 22 to the respective jet member chambers 16, 17, 18, 19 and 20, thereby affecting distribution of the fuel over the firebed.

Obviously, it is undesirable and a time consuming task to compensate for this fluctuation in pressure of fluid by manually adjusting the valve 24 and/or the valves 22 of the manifold M, and especially the latter valves, which are usually set to furnish the required amount of pressure fluid necessary to obtain perfect fuel distribution, and when so set should rarely be manipulated.

We compensate for this fluctuation of boiler pressure, and the consequent fluctuation of the pressure in the main chamber 26 of the manifold, by interposing a regulating device R between the main lead 23 and the main chamber 26, this regulating device R being incorporated within the body portion 25 of the manifold, although it can be made separate therefrom if found desirable or expedient.

The novel regulating or control device R of our invention comprises a main valve 34 which controls the pressure of the fluid flowing through the aperture 35 in the wall 36 separating the main chamber 26 from the passage 37 therebeneath. The passage 37 receives pressure fluid directly from the main lead 23 and in the normal operation of the regulating device substantially all of the pressure fluid must pass from the passage 37 into the main chamber 26 through the aperture 35 as controlled by the main valve 34. At times when the regulating device is not in operation, pressure fluid from the main lead 23 can pass into the main chamber 26 through the opening 38 which is controlled by a manually operable valve 39, the purpose of which will be hereinafter described in greater particularity.

The valve 34 is provided with a stem 40 which passes through the main chamber 26 and through the wall 41 of the body portion 25 into a cylindrical bore 42 housing a piston 43, which rests freely upon the upper end of the stem 40. The wall 41 forms a guide for the stem 40 and is provided with several apertures 44, establishing communication between the main chamber 26 and that portion of the cylindrical bore 42 immediately beneath the piston 43.

Above the cylindrical bore 42 the body portion 25 is provided with a threaded portion 45 into which is screwed a casing 46 housing the pilot valve V. The casing 46 is screwed into the threaded portion 45 until the enlarged upper end 47 of the casing rests firmly upon the seat 48 immediately above the threaded portion 45. The upper end of the casing 46 includes an upwardly extending circumferential flange 49, the rim 50 of which forms a seat for a diaphragm 51. A chamber 52 is formed by this diaphragm 51 and the circumferential flange 49, the latter being apertured at 53 to establish communication between the chamber 52 and the main chamber 26 by means of a passage 54 (Figure 5). The diaphragm 51 is firmly held on the rim 50 by a cover 55 which is threaded into the uppermost end of the body portion 25.

The pilot valve V is mounted within the small bore 56 and includes a plug end 57, the valve end 58 and the intermediate stem 59 which is of smaller diameter than the bore 56. Beneath the valve end 58 of the pilot valve V, the casing 46 is provided with a recess 60 which is capped by a cover 61, forming a seat for a spring 62. This spring is under compression and its upper end seats against the lower valve end 58, tending to maintain this valve in a position which will close communication between the recess or chamber 60 and the bore 56. A passage 63 extends upwardly from the passage 37 and establishes communication with the recess or chamber 60, while another passage 64 leads from the bore 56 of the casing 46 to the cylindrical bore 42 above the piston 43. Between the casing 46 and the piston 43 a vibration dampening spring 65 is interposed, and its function will be apparent as the description proceeds.

Beneath the valve 34, the lower wall 66 of the body portion is threaded internally as at 67 to receive a plug 68 forming a seat for a relatively strong spring 69, which is seated against the valve 34 and tends to maintain a closure between the passage 37 and the main chamber 26.

Within the cover 55 is a button 70 contacting the upper side of the diaphragm 51; spaced from and above this button 70 is a follower member 71 and between this follower member 71 and the button 70 a compression spring 72 is mounted. Outward movement of the follower member 71 is prevented by a cap 73 which is threaded over the cover 55 and has a projection 74 against which rests the outer portion of the follower member 71. A handle 75 is keyed to the cap 73 whereby the cap may be screwed along the cover 55, to increase or decrease the force of the spring 72. A lock 76 may also be utilized for retaining the cap 73 in any adjusted position.

When the regulating device, in accordance with the foregoing description, is first placed in service, the valves 22 of each pipe 16a, 17a, 18a, 19a and 20a are opened substantially and then the valve 24 in the main lead 23 is opened wide, admitting fluid into the passage 37 at a pressure which is equal to the pressure of the fluid in the source of supply. The spring 69 and the pressure of fluid on the valve 34 prevent admission of any pressure fluid from the passage 37 into the main chamber 26. In order to admit pressure fluid into the main chamber 26, the stoker operator loosens the lock 76 and screws the cap 73 downwardly, thereby compressing the spring 72. Compression of the spring 72 moves the button 70 downwardly, causing a downward deflection of the diaphragm 51. The diaphragm in turn depresses the pilot valve V against the spring 62, causing the lower valve end 58 to open communication between the passages 63 and 64 through the bore 56. Thus, pressure fluid is admitted from the passage 37 to the cylindrical bore 42 above the piston 43 causing downward movement thereof and the associated main valve 34.

Upon downward movement of the valve 34, pressure fluid from the passage 37 will enter the main chamber 26 but it will be at a somewhat lower pressure than the fluid in the passage 37. This is due to the fact that a considerable amount of the pressure fluid will pass from the main chamber 26 into the jet chambers 16, 17, 18, 19 and 20 through the pipes 16a, 17a, 18a, 19a and 20a, respectively. The pressure fluid within the main chamber 26 will also react against the under side of the piston 43, since the apertures 44 establish communication between the main chamber and the cylindrical bore 42, and will also react against the under side of the diaphragm 51, since passage 54 and aperture 53 communicate between the main chamber 26 and chamber 52. The pressure of the fluid against the under side of the piston 43 will partially counteract the downward movement of this piston by the pressure of fluid thereabove, and this will cause partial closure of the valve 34. Likewise, the pressure of the fluid against the under side of the diaphragm 51 will partially counteract the downward movement of the diaphragm caused by the force of the spring 72, thus causing partial closure of the pilot valve V by the spring 62. However, as the stoker operator continues to screw down on the handle 75, the pilot valve V will admit fluid to the upper side of the piston 43 at increasing pressures, and within a short time the fluctuation of the valve 34 and the piston 43 will become stabilized. The stabilization of these elements and especially the piston 43 and the main valve 34 is brought about very quickly by the use of the vibration dampening spring 65 which retards upward movement of the piston 43 and thereby greatly reduces the frequency of reciprocation of this piston and valve 34.

Upon stabilization of the valve 34 and the piston 43, the stoker operator may continue to screw down the cap 73 until the pressure of fluid within the main chamber 26 reaches a desired point. In the use of this regulating device with the well known "BK" locomotive stoker, the pressure which is so attained in the main chamber 26 is approximately 50 pounds per square inch, which will be indicated on the gauge 28. Operation of the stoker is then begun and as the coal is delivered in front of the jet orifices 21 of the jet member 15, it will be propelled forwardly over the firebed by the blasts of pressure fluid issuing from such orifices. The stoker operator observes the distribution of the fuel and suitably adjusts the valves 22 and/or the handle 75 of the regulating device R, and after satisfactory distribution is obtained, the lock 76 is screwed upwardly against the under side of the cap 73 to prevent downward movement thereof.

Once the regulating device R and the valves 22 are set to obtain proper fuel distribution, it is not necessary to make further adjustments regardless of fluctuations in the pressure of the fluid within the passage 27. Generally, such pressure fluctuations in the passage 27 are the result of change in pressure of the fluid within the source of supply, for instance such as may be caused within a locomotive boiler at times when heavy demands are made on the boiler by the driving cylinders or other appurtenances. Should the pressure within the passage 27 be reduced because of a condition such as above stated, there will be a corresponding reduction of pressure within the main chamber 26 and also within the chamber 52 because the passage 54 establishes communication between the aforesaid chamber 52 and the main chamber 26. Any diminishing of the pressure beneath the diaphragm 51 causes the spring 72 to further deflect this diaphragm downwardly because this spring has been compressed against the pressure beneath said diaphragm, and hence, further deflection of the diaphragm will open the pilot valve wider, admitting a higher pressure of fluid above the piston 43. This will cause the valve 34 to create a greater opening between the passage 37 and the main chamber 26, thereby compensating for the reduction in pressure of the fluid in the latter. It will be understood that if the pressure within the main chamber 26 should increase for any reason, the greater pressure against the under side of the diaphragm 51 will tend to close the pilot valve V, and thus reduce the pressure in the main chamber 26. It will be understood that the above described functioning of the related valves is very rapid and hence any variation in the pressure of fluid in the main chamber will be so slight that it will not be apparent on the gauge 28.

Occasionally, it is found necessary to make temporary adjustments in one or several of the valves 22, as for instance when troublesome fire conditions occur. This can readily be done when the regulating device R is used, without the necessity of manipulating any valves except those necessary to correct the fire conditions. In prior constructions of manifolds without the regulating device, a change in the setting of a valve 22 would either increase or decrease the pressure within the main chamber 26 and cause a corresponding increase or decrease of pressure of fluid passing through all of the valves 22. Since the regulating device R according to my invention will always maintain the predetermined pressure within the main chamber 26, many difficulties of past practices are obviated.

The manually controlled valve 39 between the main lead 23 and the main chamber 26 functions as a by-pass and is opened only during an emergency, such as may arise when the regulating device fails to operate properly. When this occurs, the valve 39 is opened, permitting pressure fluid to flow from the main lead 23 directly into the main chamber 26 without first passing through the aperture 35. This manually controlled valve 39 can also be used during operation of the regulating device to remove foreign material from the jet member 15. This is accomplished by fully opening the valve 39 momentarily, thereby delivering high pressure fluid into the chambers of the jet member 15 for effectively blowing out any foreign material through the jet apertures 21. Upon closing of the valve 39, the fluid within the main chamber 26 will return to its predetermined pressure.

When the stoker is not being operated, the valve 24 is closed to the extent that the spring 69 seats the main valve 34 whereby no more pressure fluid will flow from the passage 37 to the main chamber 26; this renders the regulating device inoperative. However, it is essential that the jet member 15 issue relatively low pressure blasts of fluid over the distributing table 14 to cool the same because of the intense heat within the furnace 13. Pressure fluid is supplied into the main chamber 26 for the above stated purpose by providing the valve 39 with a small aperture 39a. This aperture is large enough to supply the jet member 15 with a low pressure of fluid for cooling of the distributor table 14. Care should be taken not to make this aperture too large, as this might affect the proper operation of the regulating device R.

In Figures 8 and 9 is shown a modification of my invention having incorporated therein a means for separating the moisture from the steam—which is the pressure fluid usually employed in operating locomotive stokers—before admission of such moist steam to the jet member 15. The admission of moist steam into the jet member 15 causes the orifices 21 to become elongated or otherwise worn in a manner which impairs the intensity and direction of the blast issuing from such orifices.

This moisture separating means includes a baffle wall 80 which crosses the intake passage 81 of the manifold M and is provided on each side with downwardly directed grooves 82. The steam passing from the main lead 23 into the intake port 81 impinges upon the baffle wall 80, the moist particles being deflected downwardly along the grooves 82 into a well 83. The steam passing over the baffle wall 80 is again directed toward the opposite side of this wall 80 by a lip 84, and thus, a further separation of the moisture from the steam is effected, the moist particles passing into the well 83 through the aperture 85. Thus, substantially moisture-free steam is admitted into the passage 37, thereby greatly reducing the cutting action of the steam upon the orifices of the jet member 15.

Below the well 83, a pipe 86 is screwed into the body portion 25 of the manifold, and at a considerable distance beneath the well 83 the pipe 86 has an automatic drain 87 therein. This drain comprises a valve 88 and a spring 89 which acts to open the valve 88 in the absence of substantial pressure thereabove. Thus, when the main lead 23 is admitting high pressure steam into the manifold M, the valve 88 will remain closed, and the moisture separated from the steam will gradually accumulate in the reservoir formed above the valve 88. When operation of the stoker is discontinued, the pressure in the main lead 23 is reduced substantially, causing a corresponding reduction of pressure upon the valve 88, whereby the same may open to drain off the accumulated moisture.

From the foregoing description it will be apparent that a practical regulating device has been provided which is adaptable for general use and particularly to improve certain undesirable conditions concomitant with the operation of stokers, and especially those of the locomotive type.

Having described our invention, we now claim the following as new and useful in the art to which this invention pertains.

We claim:

1. In a pressure fluid regulating device, the combination comprising a body member having therein a passage for receiving pressure fluid from a source of supply, a main chamber and a communicating aperture between said passage and said main chamber, a valve cooperating with said aperture for controlling the flow of pressure fluid from said passage to said main chamber, resilient means reacting on said valve for maintaining the latter in a closing position with respect to said aperture during absence of pressure in said passage and main chamber, and means for maintaining a predetermined pressure of fluid in said main chamber, said last named means including a piston responsive to the pressure of fluid within said passage for moving said valve against said resilient means in an opening direction, said piston being also responsive to the pressure of fluid within said main chamber whereby said valve may move in the opposite direction, and means independent of the pressure of fluid reacting on said piston for retarding the movement of said valve in the last named direction.

2. In a pressure fluid regulating device, the combination comprising a body member having therein a passage for receiving pressure fluid from a source of supply, a main chamber and a communicating aperture between said passage and said main chamber, a valve cooperating with said aperture for controlling the flow of pressure fluid from said passage to said main chamber, resilient means reacting on said valve for maintaining the latter in a closing position with respect to said aperture during absence of pressure in said passage and main chamber, and means for maintaining a predetermined pressure of fluid in said main chamber, said last named means including a cylinder, a piston in said cylinder, a pilot valve between said passage and said cylinder for controlling the flow of pressure fluid from said passage to said cylinder at one side of said piston for moving the same against said resilient means in one direction, such movement of said piston causing said first named valve to open communication between said passage and the main chamber, said cylinder receiving pressure fluid from said main chamber for moving said piston in the opposite direction whereby said first named valve may move in a direction to close communication between said passage and the main chamber, and resilient means independent of the pressure of fluid reacting on said piston for retarding the movement of said piston in the last named direction.

HOWARD P. ANDERSON.
JOSEPH B. MacKENZIE.